Feb. 8, 1927.
C. MATLOCK
1,617,073
APPARATUS FOR SEPARATING PARTICLES FROM GASES AT HIGH TEMPERATURES
Filed Nov. 16, 1921
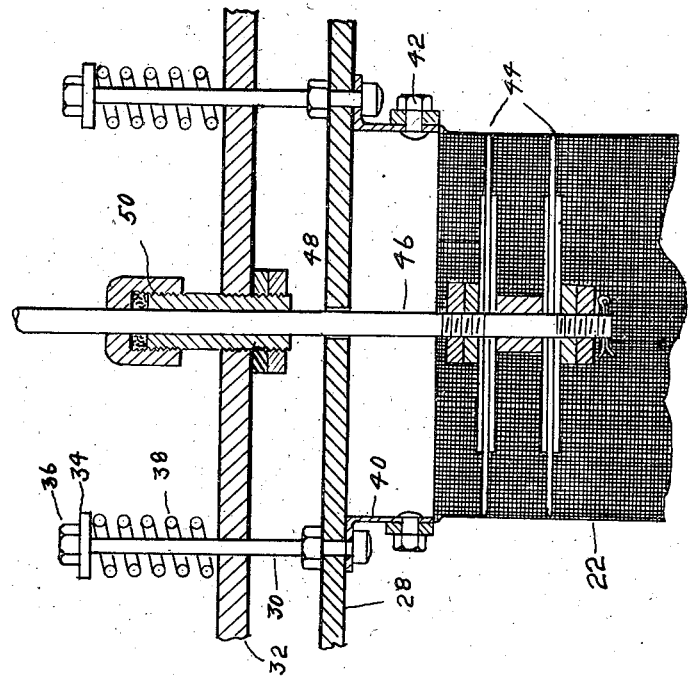
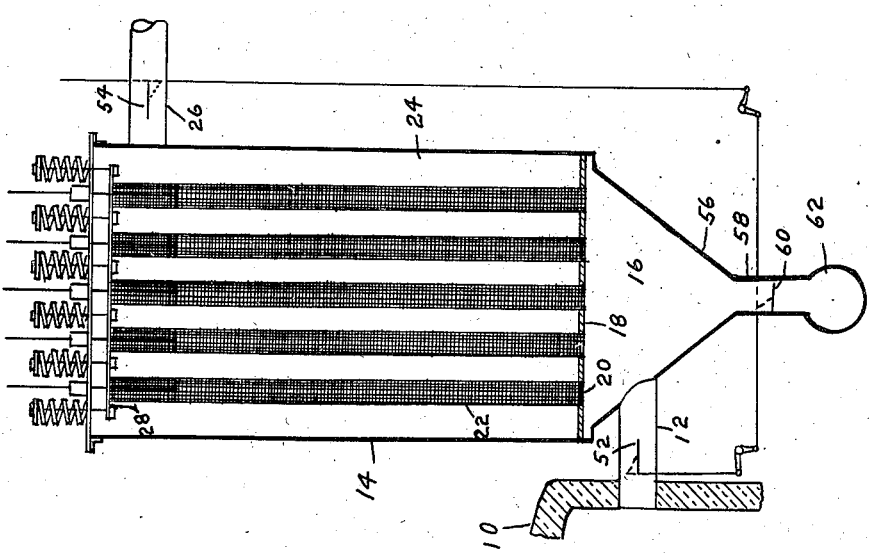
INVENTOR.
CHAUNCEY MATLOCK
BY Chester H Braselton
ATTORNEYS.

Patented Feb. 8, 1927.

1,617,073

UNITED STATES PATENT OFFICE.

CHAUNCEY MATLOCK, OF NEW YORK, N. Y., ASSIGNOR TO MONROE-LOUISIANA CARBON COMPANY, OF MONROE, LOUISIANA, A CORPORATION OF DELAWARE.

APPARATUS FOR SEPARATING PARTICLES FROM GASES AT HIGH TEMPERATURES.

Application filed November 16, 1921. Serial No. 515,673.

The present invention relates to an apparatus for separating particles from gases at high temperatures and more particularly to an apparatus for separating carbon black or soot from hot flue gases.

Carbon black has been commonly produced heretofore by the incomplete or imperfect combustion of natural gas hydrocarbons and the collection of the carbon particles set free in the combustion on cool surfaces or by filtration after the flue gases have been chilled sufficiently to permit them to be filtered through ordinary filter cloth. In cooling the hot gases a quantity of tars and oils which have been produced during combustion are condensed and deposited on the filters with the carbon and render the product unsuitable for many uses without removal of the tars and oils and purification of the carbon. In a process recently developed, and described in my copending application Serial No. 486,434 the carbon is filtered and separated from the hot flue gases directly without cooling and while the tars and oils contained in the gases are in a vaporous or gaseous condition, the carbon being thereby filtered and collected in a substantially dry and uncontaminated condition. Filtration under these conditions requires the use of screens or filters capable of resisting or withstanding high temperatures as for example screens of nichrome wire. These screens expand as they are heated by contact with the hot gases and contract again as they cool with a consequent tendency to buckle and bend and rapidly deteriorate.

An object of the present invention is to provide a means for filtering carbon black and soot from hot flue gases which will permit of expanding and contracting with changes in temperature without deterioration.

Another object of the invention is to provide a metallic screen arrangement which will be maintained taut under all temperatures and conditions of use.

Another object of the invention is to provide a means for supporting tubular wire screens which will permit the screens to be held and supported at a definite tension under all temperature conditions and to permit of contraction and expansion under definite tension.

With these and other objects in view the invention comprises the apparatus described and set forth in the following specification and claims.

The various features of the invention are illustrated in the accompaying drawings in which:

Fig. 1 is a sectional vertical elevation of a separating screen device embodying a preferred form of the invention, and, Fig. 2 is an enlarged detail view of a portion of the screen supporting apparatus illustrated in Fig. 1.

In the present invention the hot flue gases containing suspended particles of carbon black are removed from a closed furnace in which the carbon particles are produced by the partial combustion of natural gas hydrocarbons and upon leaving the furnace pass directly through filter screens without being cooled to a substantial degree. The screens are rigidly fastened at one end, preferably the lower end, and the upper end of the screen is suspended from a frame or support which is movable upwardly and downwardly and retained under tension in its various positions by means of springs or other suitable means. In the preferred form of the invention the screens are tubular in shape having an open end which is rigidly supported and through which the flue gases and suspended carbon enter the interior of the screens. The filtered gases are received in a chamber from which they may be exhausted to a subsequent cooling and filtering means or to the atmosphere. The upper ends of the cylindrical screens are closed and are suspended from a frame to which an upwardly-acting force is applied through the tension of springs acting between the frame and the top of the filter chamber.

Referring more particularly to the accompaying drawings the flue gases and carbon particles produced in a furnace, a portion of which is illustrated at 10, are withdrawn through an outlet pipe 12 to the lower part of a filter chamber 14. The gases entering the filter chamber are received in a compartment 16 formed by means of a horizontal partition 18 extending across the filter chamber 14. From the chamber 16 the flue gases and suspended carbon particles pass upwardly through openings 20 in the partition 18 and are received within cylindrical screens 22 the open ends of which are secured in the openings 20. The flue gases pass outwardly through the screens 22 leaving the carbon deposited on the interior of the screens, the tarry and body constituents of the gases being in a vapor or gaseous condition and passing through the screens with the gases. The gases and vapors are received in an upper compartment 24 in which the screens 22 are suspended and thereupon pass outwardly through an exhaust pipe 26.

The upper end of the screens 22 are suspended from a plate 28 which is urged upwardly by means of rods 30 which pass through the top 32 of the chamber 14. The rods 30 are provided at their upper ends with plates or washers 34 and nuts 36 for adjusting the position of the plates on the rods and enclose springs 38 between the plates and the upper surface of the top 32. Through the action of the springs 38 the frame 28 is placed under a definite upward tension but is able to rise or fall with the expansion and contraction of the screens under a definite tension. Other tension means than the springs 38 may of course be substituted therefore.

The screens 22 may be supported from the frame 28 in any suitable manner. In the preferred form of the invention the plate 28 is made of a solid construction and is provided with downwardly depending annular flanges 40 of a size approximately the same as the screens 22. The upper edges of the screens are bolted by means of short bolts 42 or otherwise firmly attached to the flanges 40 the plate 28 serving thereby to close the upper ends of the screens.

Each screen is also provided with a scraping or brushing device 44 carried on a rod 46 which passes through an opening 48 in the frame 28 and through a stuffing box 50 on the top of the filter chamber. At periodic intervals communication is closed through the pipes 12 and 26 by means of dampers 52 and 54 and the scrapers 44 and rod 46 are caused to descend pushing downwardly the accumulated deposit of carbon from the inner surface of the screens into the lower part of the chamber 16. The chamber 16 is provided with downwardly sloping walls 56 which form a funnel shaped bottom leading to a removing chute a damper 60 in the chute being opened to permit the carbon to pass from the bottom of the chute. The carbon enters a conveying chamber 62 through which it is conveyed to a storage receptacle.

Through the above arrangement the carbon may be filtered from the flue gases by passage through metallic or other wire screens or suitable heat resisting filtering medium which may be either rigid or flexible. The medium is enabled to expand and contract without danger of buckling or bending and without the destructive action which would be caused by buckling or bending. As indicated above the specific form of the screens and of the tension means may be changed to suit any desired condition.

Having described the invention what is claimed and desired to be secured by these Letters Patent is:

1. A separating and filtering screen adapted to separate carbon and similar materials from hot flue gases which comprises a filter chamber, a partition in said chamber having a number of openings, tubular screens mounted at their open ends in said openings, a supporting plate to which the upper ends of said screens are attached, rods extending upwardly from said screens through the top of said chamber and springs confined between the tops of said rods and the top of said chamber.

2. A separating or filtering device adapted to separate carbon and similar materials from hot flue gases which comprises a filter chamber, a cylindrical screen having an open end attached to the lower part of said chamber and adapted to receive flue gases to be filtered therein, a supporting plate having a depending annular flange, the upper end of said screen being attached to said flange, and a spring connection between said plate the top of said chamber, and means within said screens for removing material deposited thereupon.

3. A separating and filtering device adapted to separate carbon and similar finely divided materials from hot flue gases and similar gases which comprises a filter chamber having a funnel shaped bottom, a horizontal partition in said chamber having a member of openings, cylindrical screens open at their lower ends and mounted in said openings, a supporting frame for the upper ends of said screens, means for supporting said frame from the top of said filter chamber in a manner to permit said frame to rise and fall in a definite tension with the heat expansion of said screens and to hold said screens rigid at all times and means for removing carbon from the inner surface of said screens to said funnel shaped bottom of said chamber.

4. A separating and filtering device adapted to separate carbon and similar materials from hot flue gases comprising a filter chamber, a partition in the lower portion of said chamber and having a plurality of openings therein, a plurality of vertical cylindrical screens mounted with their open lower ends fixed in said openings, a floating supporting plate near the upper end of said filter chamber, the upper ends of said cylindrical screens being fixed thereto, a yielding connection between said plate and the top of said filter chamber, scraper discs located within said cylindrical screens and means for imparting a vertical movement to said discs comprising rods passing through the top of said filter chamber.

5. A separating and filtering device adapted to separate carbon and similar finely divided materials from gases which comprises a filter chamber, a partition in said chamber having a number of openings, tubular screens open at their lower ends mounted in said openings, a supporting frame for the upper ends of said screens, expansion compensating means connecting said frame and the top of said chamber to hold said screens in rigid shape, and means for removing carbon from the inner surfaces of said screens.

In testimony whereof I affix my signature.

CHAUNCEY MATLOCK.